H. SMILEY.
DADO PLANE.
APPLICATION FILED NOV. 30, 1909.
984,610.
Patented Feb. 21, 1911.
2 SHEETS—SHEET 1.
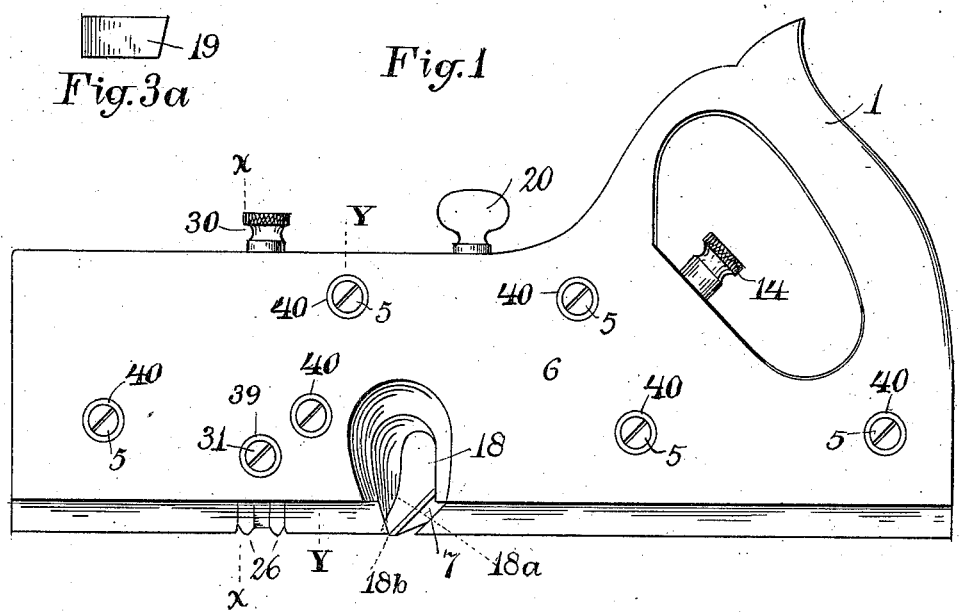
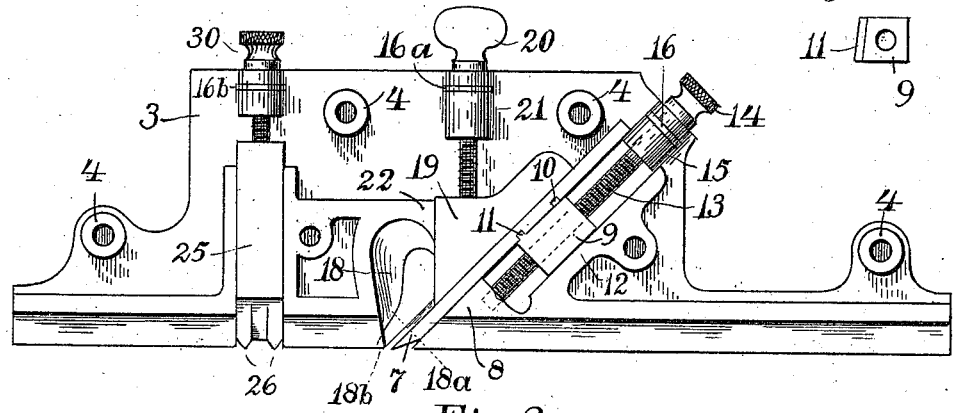
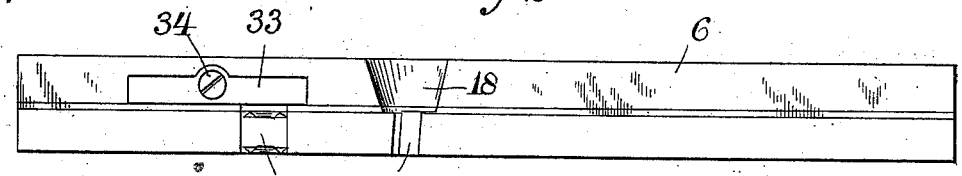
Witnesses;
Margaret L. Waite
Edwin E. Waite
Inventor,
Henry Smiley;
By A. B. Upham,
Attorney.

H. SMILEY.
DADO PLANE.
APPLICATION FILED NOV. 30, 1909.

984,610.

Patented Feb. 21, 1911.

2 SHEETS—SHEET 2.

Witnesses:
Margaret L. Waite.
Edwin E. Waite

Inventor,
Henry Smiley;
By A. B. Upham,
Attorney.

UNITED STATES PATENT OFFICE.

HENRY SMILEY, OF BOSTON, MASSACHUSETTS.

DADO-PLANE.

984,610. Specification of Letters Patent. Patented Feb. 21, 1911.

Application filed November 30, 1909. Serial No. 530,706.

*To all whom it may concern:*

Be it known that I, HENRY SMILEY, a citizen of the United States, residing at the city of Boston, in the county of Suffolk and Commonwealth of Massachusetts, have invented certain new and useful Improvements in Dado-Planes, of which the following is a specification.

This invention relates to that class of groove cutting planes usually termed dado planes, and it has for its object the effecting of the improvements in details of construction hereinafter set forth.

Figure 4:
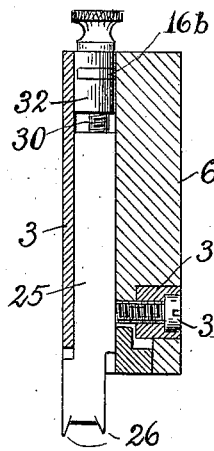
Figure 5:
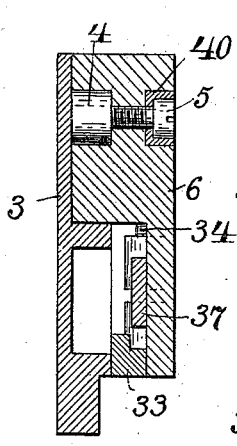
Figure 6:
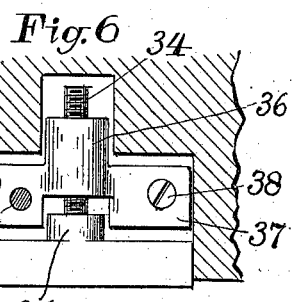
Figure 7:
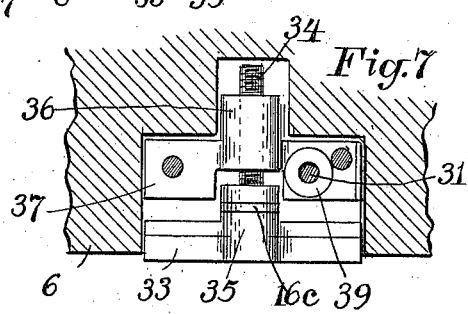
Figures 9, 11:
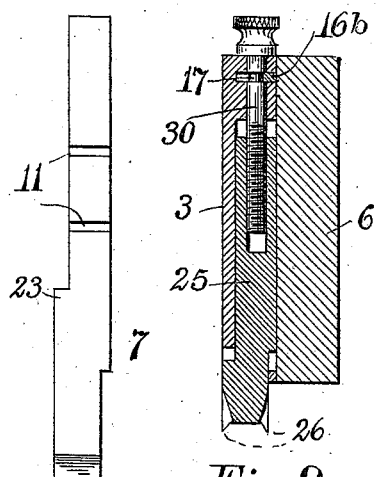
Figure 8:
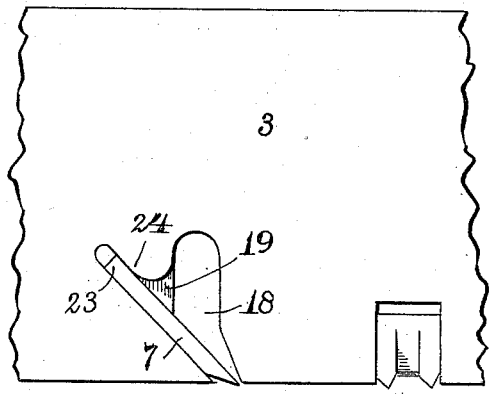
Figures 10, 12:
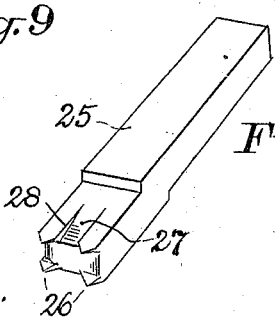

Referring to the drawings forming part of this specification, Figure 1 is a side view of a plane made in accordance with my invention. Fig. 2 is a side view of the metallic part thereof, the wooden section forming part thereof being represented as removed. Fig. 3 is an edge view of the plane from beneath. Fig. 3ª is an end view of the blade-engaging block. Fig. 3ᵇ is an end view of the blade-wedge. Fig. 4 is a transverse section on the dotted line X—X in Fig. 1; this and the following views being on a slightly larger scale than the preceding. Fig. 5 is a transverse section on the dotted line Y—Y in Fig. 1. Fig. 6 is a longitudinal vertical section of a part of the plane showing the gage for permitting adjustment of the depth to which the plane can cut. Fig. 7 is a similar view but from the opposite side. Fig. 8 is a side elevation of a portion of the plane from a point opposite to that from which Fig. 1 is taken. Fig. 9 is a transverse sectional view of the plane through the center of the grooving cutters. Fig. 10 is a perspective view of said grooving cutters. Fig. 11 is a face view of the cutting blade of the plane. Fig. 12 is a face view of one of the U-shaped locking devices.

The plane comprises two main parts, one of metal containing the operating members, and the other of wood or the like inclosing said members at one side and having the handle 1. Said metallic portion consists of the thin plate 3 from which rise certain ribs and also the bosses 4 into which are tapped the screws 5 by means of which said wooden part 6 is secured to said metallic part.

The blade 7, shown in Figs. 2 and 11, rests against the rib-section 8 and also against the adjusting block 9, being made to share the longitudinal movement of the latter by means of one of its transverse grooves 10 into which projects the rib 11 of said block. This block is moved along the surface of the inclined rib 12 by means of the adjusting screw 13; the latter being turned by its head 14, and held against longitudinal displacement by bearing 15 and the U-shaped locking device 16 located in a transverse slot in said bearing and engaging an annular groove 17 in the screw. Fig. 12 shows this locking device in face view, while Fig. 9 shows a duplicate of the same in section. Above the cutting edge of said blade 7 is a shaving-deflector mouth 18, which, as shown in Figs. 1, 2 and 3, is so conformed as to perfectly eject all the shavings ploughed up by said blade. As indicated by Fig. 1, said mouth is substantially horse-shoe shaped vertically, while, as in Fig. 3 it is trumpet shaped laterally, thereby performing the function above set forth. Said blade is clamped in place by the vertically moved triangular block 19, the means for its movement being the thumb-screw 20 turning in the bearing 21 and held from longitudinal displacement by the U-shaped lock 16ª, a duplicate of that illustrated by Fig. 12. As shown in Fig. 2, the nose of this clamping block 19 comes quite close to the cutting end of the blade 7, and the entire length, nearly, of said blade is so tightly pressed by said block as to firmly hold it against all possibility of displacement or chattering. The vertical face or edge of this block abuts against the end of the rib 22 in order that there may be no lateral strain on the thumb screw 20, but have for its only function that of raising and lowering said block. To keep the cutting edge of said blade 7 flush with the metallic face of the plane and still leave the plate 3 intact, said blade is off-set somewhat, as shown in Fig. 11, and a part of said plate cut into as shown in Fig 8 to make room for the offset shoulder 23. To remove the blade for resharpening, the thumb screw 20 is turned to raise the block 19 a short distance, and then the screw 13 turned until the blade is carried far enough downward to bring its shoulder 23 out from beneath the lip 24. The blade can now be moved laterally out of its engagement with the rib 11 of the block 9, and then longitudinally withdrawn from the plane. Its return is in the reverse manner.

It is customary to provide these dado planes with cutters in advance of the blades for the purpose of scoring the lateral limits of the groove being plowed in the wood, in order that the shavings may be cut by the blade clear and clean from the wood, leaving the groove smooth and exact. There are numerous objections to those now in use, which I have overcome by my construction. Previous to my invention, the cutter points have been two in number, one at each side of the plane. I have found, however, that a plurality of these cutter points at each side give much better results, and consequently I provide a vertically adjustable bar 25 with four such points 26, two at a side, as shown in Figs. 2, 9 and 10. In the formation of these cutter points, not only is the metal of the bar cut away both laterally and longitudinally with respect to the plane, in order to leave such points in operative relief, but I form channels 27 in the opposite sides of the bar in order to provide cutting lateral edges. These edges 28 are sharpened by a suitable file which can under-cut the same slightly. The cutter points are lowered to take up for sharpening, and also rigidly held in place, by means of the adjusting screw 30 and the set screw 31 (Fig. 4), the former screw being held by its bearing 32 and locking device 16$^b$ like the one 16 already described. As shown in Fig. 9, this bar has also to be off-set, for the same reason as the blade 7.

Normally the dado plane can cut to the depth permitted by the under surface of the wooden section 2. To permit accurately gaged grooves of lesser depth to be formed, I provide the adjustable stop 33 shown in Figs. 3, 6 and 7. This is cut into the wooden section 6, and is adjusted by means of the screw 34 turning in the boss 35 and tapped into the boss 36 of the plate 37 which is fixed in place by suitable screws 38. Said screw 34 being kept from displacement in its boss 35 by a locking device 16$^c$ such as already described, is adjusted either down to desired specified point, or carried up to its normal flush position, by suitably rotating said screw. Said fixed plate 37 is formed with a circular boss 39 (Figs. 4 and 7) for receiving the set screw 31 already described; said boss extending out flush with the wooden section 6, and so providing said set screw with a metallic threaded member for its proper support. Thus made, this dado plane is strong, durable; its operative members are readily adjusted, cut clean and smooth, and in every way performs its work well and conveniently. It should be noticed that the cutter points 26 are each substantially like those of a saw tooth, being angular and having cutting edges both in front and behind. This enables them to cut and score the wood both when the plane is being advanced, and when it is being drawn backward, thus more perfectly preparing the way for the blade 7 to do its work. Moreover, the cutting edges 28 above described act to smooth the sides of the groove being planed.

It will be observed that by having the angular block 11 formed with a vertical face coming down sharply to the upper surface of the blade 7, there is no opportunity given for the lodgment of shavings against the same; hence, taking this in connection with the peculiar conformation of the mouth 18, there can be no choking at the cutting edge of said blade, and consequently no vexatious loss of time in digging out such accumulated chips.

As shown in Figs. 4, and 9, the U-shaped locking devices 16, 16$^a$, 16$^b$, 16$^c$ are held in place by the wooden section 6 fastened over the metallic section, and consequently all that requires to be done in order to take the various screws 13, 20, 30 and 34 out, is to first remove said wooden section, then pry out said U-shaped devices and unscrew said members. To keep the fastening screws 5 from digging into the wooden section 6, I prefer to provide therefor the metallic thimbles 40, shown in Figs. 1 and 5, the outer edges of which are flush with the face of said section, and which receive the heads of said screws flush with the same also.

It is essential that the surface of the mouth 18 opposite the blade 7 shall be made to initiate in the shaving a spiral form as it leaves the edge of said blade. To accomplish this, I form said surface 18$^a$ with a twist in such a manner that the rear edge of the mouth will retire behind the front edge at 18$^b$, as shown in Figs. 1 and 2. This twist extends upward from the blade edge for about five eighths of an inch; after that it being merged into the trumpet flare above described.

As shown in Fig. 3$^b$, the block 9 is given a slightly oblique face on its side lying against the surface of the blade 7, inasmuch as the latter is laterally inclined in order to better cut the wood being grooved. In the same way, the wedge 19 must have its face lying against the blade similarly oblique, as shown in Fig. 3$^a$.

What I claim as my invention and for which I desire Letters Patent is as follows, to wit;

1. The combination with a dado plane, of cutter points therefor comprising a metal bar having its end fashioned into four saw-shaped points, each pair of points on the faces of the bar parallel with the sides of the plane being separated a substantial distance one from the other by a vertical clearance channel extending up toward the upper end of said bar, the sides of said channels presenting cutting edges.

2. A dado plane comprising two parts one of which is metal and is formed with two vertical parallel walls, a cutter point bar fitted to said walls, the other of said two parts being of wood and inclosing said bar, a metal plate fitted to the inner surface of said wooden part and having a cylindrical boss passing through said wooden part to its outer surface, and a set screw tapped through said boss and butting against said bar.

3. The combination in a dado plane, of a metallic section, a cutter-point member carried thereby, a screw for the adjustment of said member having an annular groove therein, a bearing for said screw formed with a transverse slot, a U-shaped locking device located in said slot and engaging said groove, and a section fastened to the metallic section and retaining said locking device in place.

In testimony that I claim the foregoing invention, I have hereunto set my hand this 13 day of November, 1909.

HENRY SMILEY.

Witnesses:
 A. B. UPHAM,
 H. L. WHITTLESEY.